July 5, 1932.  G. A. BONELLI  1,865,740
PNEUMATIC SPRING
Filed Jan. 5, 1929
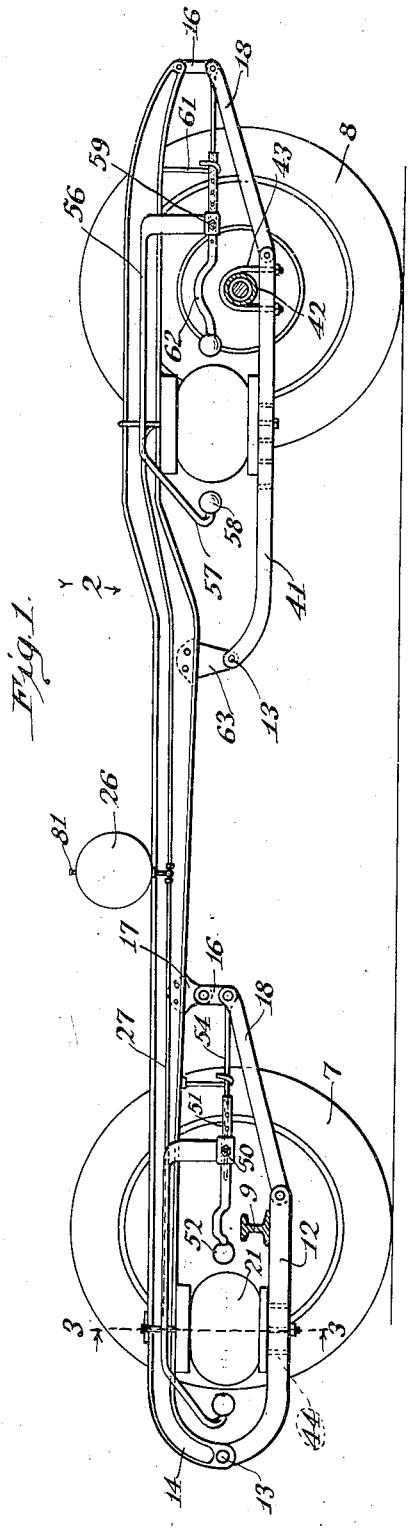
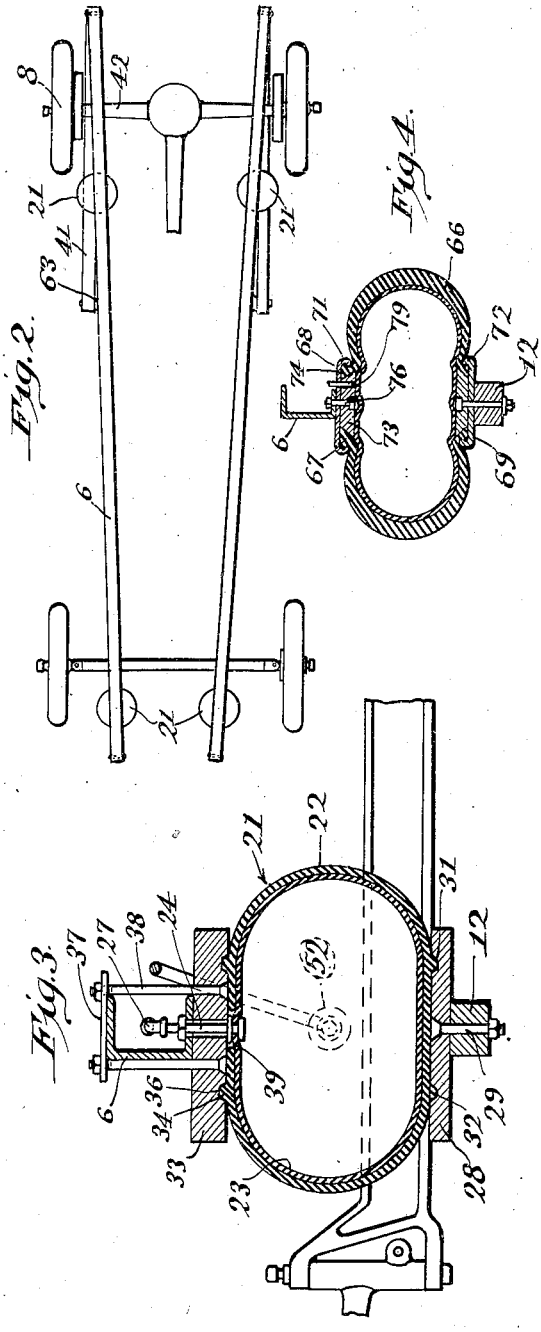
Inventor.
George A. Bonelli.
by Hazard and Miller
Attorneys.

Patented July 5, 1932

1,865,740

UNITED STATES PATENT OFFICE

GEORGE A. BONELLI, OF KINGMAN, ARIZONA

PNEUMATIC SPRING

Application filed January 5, 1929. Serial No. 330,449.

This invention relates to springs, and more especially to vehicle springs.

An object of the invention is the provision of a pneumatic spring particularly adapted for use either in conjunction with or to completely supplant the conventional vehicle spring, although the pneumatic spring of the present invention is also adapted for use in other mechanisms than vehicles.

A further object is the provision of a pneumatic vehicle spring construction including a shock absorbing device capable of assisting the principal portion of this spring when an unusually heavy shock is imparted thereto.

A still further object is the provision of a vehicle spring construction as described, having combined therewith a novel and efficiently operating type of recoil absorbing device.

Another object is the provision of a pneumatic spring construction of such design that it is capable of being installed in the place of a conventional steel spring with which a vehicle such as an automobile, has previously been equipped, and which is capable of operating more efficiently in absorbing the shocks imparted to the running-gear of the vehicle, than the conventional steel spring.

The invention possesses other objects and advantageous features, some of which, with those enumerated, will be set forth in the following description of the invention's particular embodiment which is illustrated in the drawing accompanying and forming a part of the specification.

Referring to the drawing:

Figure 1 is a sectional view taken longitudinally through the chassis of an automobile and showing the forward and after spring constructions of my invention, as employed upon this type of vehicle.

Fig. 2 is a plan view, the direction of view being indicated by the arrow 2 of Fig. 1.

Fig. 3 is a transverse, vertical sectional view through the spring. The plane of section is indicated by the line 3—3 of Fig. 1, and the direction of view by the arrows.

Fig. 4 is a detail view similar to Fig. 3, but showing a slightly modified form of spring construction.

In terms of broad inclusion, the spring construction of the present invention comprises a receptacle composed of yielding material and filled with compressible fluid such as air, under pressure. This receptacle is interposed between two members movable in respect to each other, such as the frame of an automobile, and an arm disposed therebelow to support the frame through the medium of the receptacle, it being understood that the weight of the frame and objects supported thereupon, such as the body of the vehicle and its load, is carried by one or more of the receptacles and arms to which one or more axles and wheels are operatively connected.

Specifically describing the invention's most practical embodiment of which I am at present aware, the springs of the present invention are herein disclosed as being interposed between the frame 6 and the forward and after wheels 7 and 8 respectively, supporting the frame. The forward wheel 7 is operatively connected to the front axle 9, preferably by the conventional steering knuckle 11; and this axle supports preferably a pair of arms 12 adjacent the after end thereof. The forward end of the arm 12 is pivoted as at 13, to the adjacent forward end or spring horn 14 of the frame 6. A spring shackle 16 is pivoted at its upper end to the frame 6, by means of a suitable bracket 17, and has a link 18 pivoted to the lower end thereof, the link 18 extending in angularity from the shackle 16 to be pivotally connected adjacent the after end of the arm 12. This structure is intended to supplant the conventional steel spring with which automobiles are regularly equipped; and it is obvious from the arrangement of the pivotal connections, that the after end of the arm 12 is free to move to and from the frame 6, and that as the arm 12 moves towards the frame, the lower end of the shackle 16 will be swung toward the rear of the vehicle, and when the arm 12 moves away from the frame 6, the lower end of the shackle 16 will be swung toward the forward end of the vehicle.

A yieldable receptacle 21 is interposed between the arm 12 and the frame 6, in such a manner that the weight of the frame 6 and any objects supported thereupon, such as the body of the vehicle and its load, are imposed upon the various arms 12 through the associated receptacles 21. Each receptacle 21 is filled with a compressible fluid such as air under pressure, and the natural resiliency of this fluid enables it to expand and contract as the receptacle 21 changes in shape due to the varying pressures imposed thereupon as the vehicle traverses an uneven surface, imparting shocks to the axle 9 and arm 12.

One form of receptacle is shown in Fig. 3, wherein the casing 22 is composed of any flexible material such as leather or combination of rubber and fabric. This casing 22 is preferably so formed that when it is relieved of pressure, it is roughly spherical in shape, whereas when pressure is imposed thereupon, it is pressed to oblate spheroidal configuration, as clearly shown upon Figs. 1 and 3. If it be desired that the casing 22 be so constructed that it is not necessarily airtight, an inner bladder 23 may be employed. A tube 24 is in communication with the interior of the bladder 23 to permit insertion of air or other compressible fluid thereinto. Preferably the tubes 24 of all the receptacles 21, are inter-connected with each other and with a supply reservoir 26, through the expedient of conduits 27, with the result that all the receptacles 21 may be inflated simultaneously and equal pressure is maintained in all of them.

Each receptacle 21 rests upon a plate 28, which is rigidly attached to the associated arm 12, as by a bolt 29. Lateral displacement of the receptacle 21 is prevented by beads 31 or other projections preferably upon the receptacle 21, received within complementary notches 32 in the plate 28. Moreover, the receptacle 21 may be cemented to the plate 28, if desired. Another plate 33 is interposed between the frame 6 and the receptacle 21, and similar beads 34 and notches 36 serve to retain the receptacle 21 in place in respect to the plate 33 also. Cement may be employed here also, if desired. A clamp 37 and bolts 38 retain the plate 33 rigidly in place against the under side of the frame 6. An aperture 39 in the casing 22 through which the tube 24 extends, and through which the bladder 23 may be inserted or removed, is covered by the plate 33 to effectually retain it closed.

The construction of the spring mechanism associated with the after wheels 8, is quite similar, the after arm 41 preferably being considerably longer than the forward arm 12. The shackle and connecting link may be the same as those employed for the front axle 9; and the rear axle housing 42 is suitably attached to the arm 41 adjacent the after end thereof, as by a U bolt 43.

It is obvious that by loosening the bolts 38 holding the upper plate 33 to the frame 6, and by removing the bolt 29 holding the lower plate 28 to the arm 12 or 41, the entire plate and receptacle assembly may be slid forward or aft to vary the distance thereof from the pivotal connection of the arm 12 or 41, to the point at which pressure is applied to the receptacle 21.

The arm acts as a lever, the fulcrum of which is at the bolt 13, and to which the force is applied by the axle 9 or axle housing 42, as the case may be. Obviously, the pressure exerted upon the receptacle 21, will be greater when the receptacle is near the fulcrum 13 than when it is moved further therefrom; and hence, this adjustability of the receptacles 21, permits ready adjustment of the springs to meet different road conditions or to accommodate different loads. A plurality of holes 44 are formed in each of the arms 12 and 41, to permit anchoring the lower plate 28 in selected position, and the upper plate 33 may be anchored wherever desired, by tightening its bolts 38.

A rod 51 is pivoted to the lower end of each of the shackles 16, and bears upon its other end, a ball 52. Preferably this rod is composed of two sections 53 and 54, telescopically joined to vary the effective length thereof so that the ball 52 may be positioned closely adjacent the after side of the associated receptacle 21. Adjustably mounted upon the rod 51 is another rod 56 which extends upward to pass around the receptacle 21, and is reversely bent as at 57 to position another ball 58 closely adjacent the forward side of the associated receptacle 21. The rod 56 is connected to the rod 51 by means of a pin 59; and this same pin 59 may conveniently be employed to fasten the two portions 53 and 54 of the rod 51, together in selected arrangement. Any suitable bracket 61 may be employed to support the forward end of the rod 51, and an offset portion 62 may be formed in the rod 51 to afford ample clearance for the axle 9 or 42, as the case may be.

Preferably the brackets 63 to which the forward ends of the after arms 41 are pivoted, extend laterally outwards from the frame 6, so as to increase the distance between the two after arms 41. This of course, increases the distance between the supports of the body of the vehicle, adding to its lateral stability and tending to diminish side sway. However, this construction is optional, and depends upon the requirements of the individual case, it being determined largely upon the amount of clearance between the receptacles 21 and the wheels 8.

Fig. 4 shows a slightly modified form of receptacle 66. Here the receptacle is constructed in the form of an annulus, which instead of being closed at its inner circumference, is open and is provided upon each side with a clincher or other bead 67, after the fashion of the conventional pneumatic tire, but of considerably smaller diameter. Upper and lower plates 68 and 69, respectively, having bead engaging flanges 71 and 72 respectively, are disposed between the receptacle 66 and the frame 6 or the arm 12, respectively, as the case may be. A disc 73 is associated with each of the plates 68 and 69, this disc being in the form of a frustum of a cone so that its sloping sides 74 engage the under side of the beads 67. The discs 73 are held in place by bolts 76 or their equivalent, so that the beads 67 are securely clamped between the edges of the discs 73 and the associated plate 68 or 69. This construction affords various conveniences over that previously described, in that positive means are provided for preventing separation of the receptacle 66 from the frame 6 or the arm, and also greater convenience of access to the interior of the receptacle 66 to repair or replace the bladder 78, is afforded. A tube 79, extending through the upper disc 73, affords means for inflating the receptacle 66.

The operation of the pneumatic spring of my invention is substantially as follows:

All the yieldable receptacles and the reservoir 26 should first be inflated to the proper pressure. For this purpose an inlet valve 81 is provided upon the receptacle 26. When this has been accomplished, the entire weight of the frame 6 and objects supported thereupon, rests upon the inflated receptacles. The inherent elasticity of the air or other fluid with which the system is inflated, will permit the axles 9 and 42, to work up and down resiliently in respect to the frame 6, so as to absorb shocks imparted to the running-gear of the vehicle, and cause the vehicle to ride easily. Furthermore, when one of the wheels encounters a bump, the arm 12 is moved toward the frame 6, and the lower end of the associated shackle 16 is moved backwards, carrying with it the rods 51 and 56. Consequently, when an unusually large bump is encountered, the forward ball 58 will engage the forward side of the receptacle to assist the receptacle in preventing further movement of the arm 12 toward the frame 6. The after ball 52 serves as a rebound check, because as the arm 12 moves away from the frame 6, the lower end of the shackle 16 is swung forward, carrying with it the rod 51 so that the ball 52 will engage the after side of the receptacle, tending to dampen or check any extensive rebound of the axle and wheels away from the frame 6. It is readily apparent therefore, that the apparatus herein described, serves not only as an efficiently operating spring, but also as a shock absorber and a rebound absorber.

It is to be understood that the details of the invention as herein disclosed, are subject to alteration within the spirit or scope of the appended claims.

I claim:

1. A pneumatic spring comprising a yieldable receptacle under compression between opposed members movable toward and away from each other, a compressible fluid in said receptacle, that portion of each of said members which engages said receptacle being flat and extending beyond the area of contact with the receptacle, and means actuated by relative movement of said members and engageable with said receptacle to limit said movement after a predetermined maximum has been reached.

2. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, and means for checking movement of said arm with respect to said frame when said movement has reached a predetermined maximum.

3. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, and means engageable with said receptacle for checking movement of said arm with respect to said frame when said movement has reached a predetermined maximum.

4. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, and means engageable with said receptacle for checking movement of said arm in either direction with respect to said frame when said movement has reached a predetermined maximum.

5. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, and a bar operatively connected to said shackle to engage said receptacle when said shackle is swung in pivotal movement with respect to said frame.

6. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, and a pair of bars, one being operatively connected to said shackle to engage the receptacle when the shackle is swung in pivotal movement in one direction, and the other bar being operatively connected to said shackle to engage the receptacle when the shackle is swung in the other direction.

7. A pneumatic spring construction comprising a frame, a shackle pivoted at one end to said frame and extending angularly therefrom, an arm pivoted at one end to said frame at a point spaced from said shackle, a link pivoted to the other end of said shackle and to the other end of said arm, a yieldable receptacle interposed between said arm and said frame, a compressible fluid in said receptacle, a pair of bars, one being operatively connected to said shackle to engage the receptacle when the shackle is swung in pivotal movement in one direction, and the other bar being operatively connected to said shackle to engage the receptacle when the shackle is swung in the other direction, and means for varying the effective length of each of said bars.

8. A vehicle spring construction comprising an arm pivoted at one end to the frame of a vehicle, a shackle pivoted at its upper end to said frame, a link pivoted to the lower end of said shackle and to the other end of said arm, a receptacle interposed between said frame and said arm and supporting the weight of the frame upon the arm, said receptacle being composed of yieldable material, a compressible fluid under pressure within said receptacle, and a bar operatively connected to said shackle to engage said receptacle when the link is swung in pivotal movement in respect to said frame.

9. A vehicle spring construction comprising an arm pivoted at one end to the frame of a vehicle, a shackle pivoted at its upper end to said frame, a link pivoted to the lower end of said shackle and to the other end of said arm, a receptacle interposed between said frame and said arm and supporting the weight of the frame upon the arm, said receptacle being composed of yieldable material, a compressible fluid under pressure within said receptacle, and a pair of bars, one being operatively connected to said shackle to engage the receptacle when the shackle is swung in pivotal movement in one direction in respect to the frame, and the other being operatively connected to said shackle to engage the receptacle when the shackle is swung in another direction.

10. A vehicle spring construction comprising an arm pivoted at one end to the frame of a vehicle, a shackle pivoted at its upper end to said frame, a link pivoted to the lower end of said shackle and to the other end of said arm, a receptacle interposed between said frame and said arm and supporting the weight of the frame upon the arm, said receptacle being composed of yieldable material, a compressible fluid under pressure within said receptacle, a pair of bars, one being operatively connected to said shackle to engage the receptacle when the shackle is swung in pivotal movement in one direction in respect to the frame, and the other being operatively connected to said shackle to engage the receptacle when the shackle is swung in another direction, and means for varying the effective length of each of said bars.

11. A pneumatic spring comprising a yieldable receptacle under compression between opposed members movable toward and away from each other, a compressible fluid in said receptacle, and means actuated by relative movement of said members and engageable with said receptacle to retard said movement.

In testimony whereof I have signed my name to this specification.

GEORGE A. BONELLI.